United States Patent
Gilbert, II

(10) Patent No.: US 9,060,503 B2
(45) Date of Patent: Jun. 23, 2015

(54) INSECT TRAP WITH IMPROVED GLUEBOARD MOUNTING, RETENTION, AND REMOVAL ASSEMBLY

(71) Applicant: David Wesley Gilbert, II, Jonesboro, AR (US)

(72) Inventor: David Wesley Gilbert, II, Jonesboro, AR (US)

(73) Assignee: Gilbert Industries, Inc., Jonesboro, AR (US)

( * ) Notice: Subject to any disclaimer, the term of this patent is extended or adjusted under 35 U.S.C. 154(b) by 239 days.

(21) Appl. No.: 13/827,361

(22) Filed: Mar. 14, 2013

(65) Prior Publication Data

US 2014/0259878 A1    Sep. 18, 2014

(51) Int. Cl.
*A01M 1/04*    (2006.01)
*A01M 1/14*    (2006.01)

(52) U.S. Cl.
CPC ................... *A01M 1/145* (2013.01)

(58) Field of Classification Search
CPC .......... A01M 1/01; A01M 1/14; A01M 1/145
USPC ................................... 43/113–117
See application file for complete search history.

(56) References Cited

U.S. PATENT DOCUMENTS

| | | | |
|---|---|---|---|
| 3,998,000 A | 12/1976 | Gilbert | |
| 5,425,197 A * | 6/1995 | Smith | 43/113 |
| 5,950,355 A * | 9/1999 | Gilbert | 43/113 |
| 5,974,727 A * | 11/1999 | Gilbert | 43/113 |
| 6,108,965 A * | 8/2000 | Burrows et al. | 43/113 |
| 6,393,759 B1 * | 5/2002 | Brown et al. | 43/113 |
| 6,560,919 B2 * | 5/2003 | Burrows et al. | 43/113 |
| 6,871,443 B2 * | 3/2005 | Lambert et al. | 43/113 |
| 6,886,292 B2 * | 5/2005 | Studer et al. | 43/113 |
| 2002/0078620 A1 * | 6/2002 | Nelson et al. | 43/113 |
| 2003/0056426 A1 * | 3/2003 | Nelson | 43/112 |
| 2006/0218851 A1 * | 10/2006 | Weiss et al. | 43/113 |
| 2007/0124987 A1 * | 6/2007 | Brown et al. | 43/113 |
| 2010/0236133 A1 * | 9/2010 | Frisch | 43/113 |

OTHER PUBLICATIONS

Professional Electrocuting Flytrap, 601T The Don, 1996.
Professional Glueboard Flytrap—601GT Sticky Lizard, 2006.

* cited by examiner

*Primary Examiner* — Darren W Ark
*Assistant Examiner* — Marc Burgess
(74) *Attorney, Agent, or Firm* — Schiff Hardin LLP

(57) ABSTRACT

In an insect trap a housing is provided having a swingable guard grill attached at a front of the housing. First and second insect attractant lamps are mounted in the housing. The guard grill has at least one window and a pivotable glueboard mounting, retention, and removal drawer assembly located at said window. The drawer assembly is pivotable at one end. The drawer assembly has a drawer panel and a V-shaped member attached to a back of the drawer panel. The V-shaped member has first and second transverse walls connecting at an apex, each wall having a respective window. A first glueboard is retained in arc-shaped fashion between said apex and the first corner and a second glueboard is retained in arc-shaped fashion between said apex and a second corner.

10 Claims, 8 Drawing Sheets

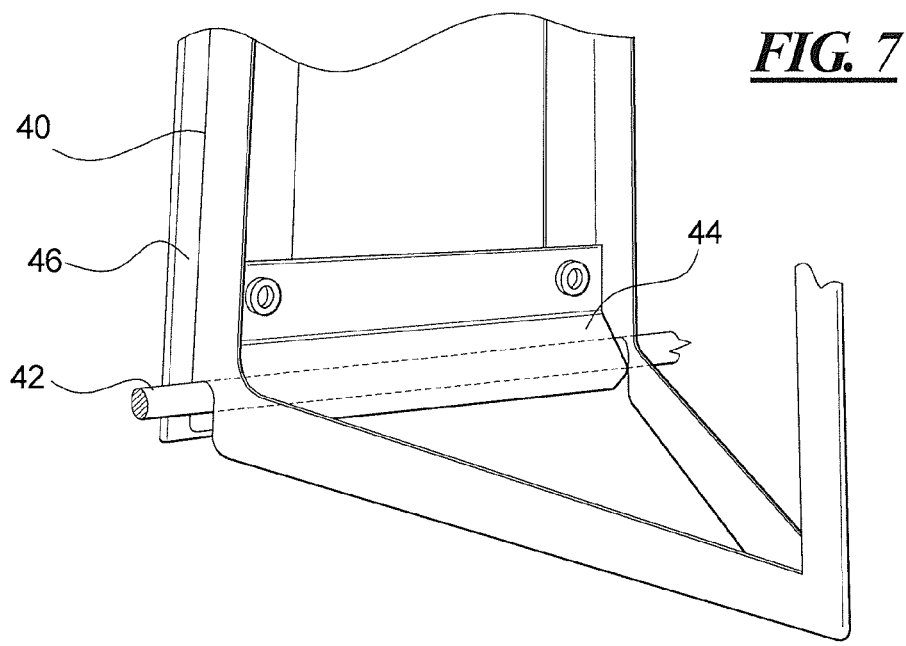
FIG. 7
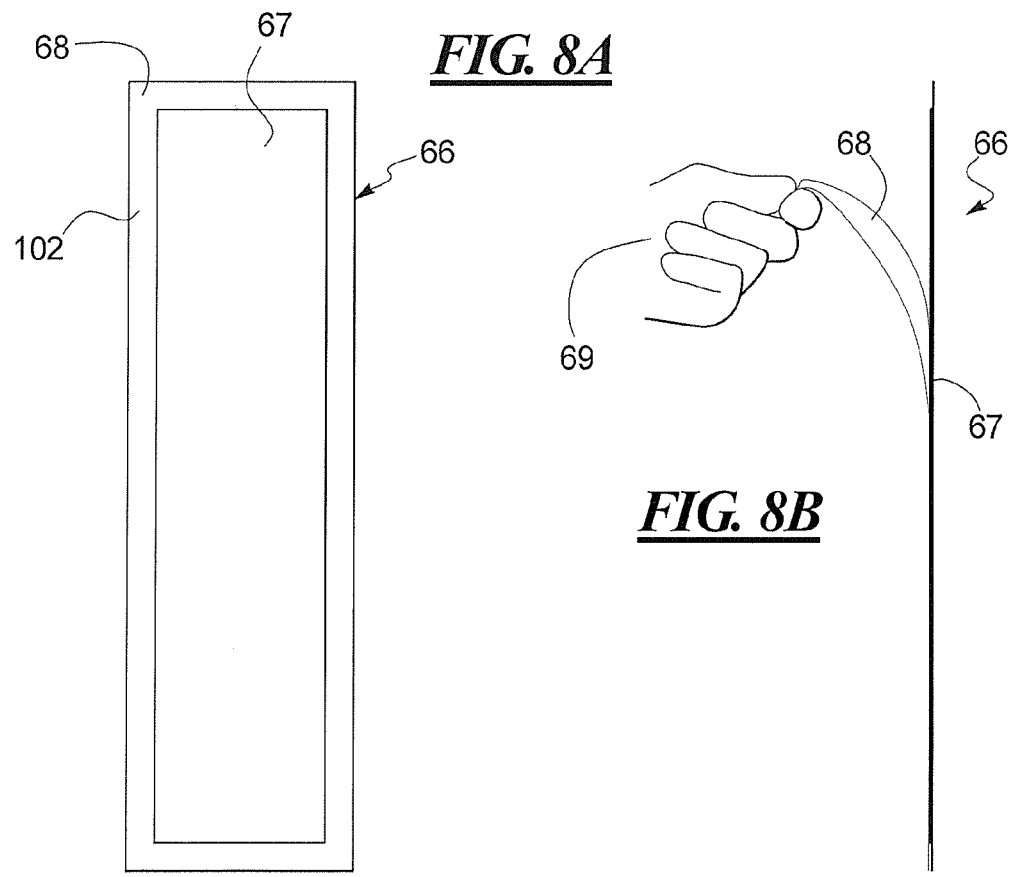
FIG. 8A
FIG. 8B

INSECT TRAP WITH IMPROVED GLUEBOARD MOUNTING, RETENTION, AND REMOVAL ASSEMBLY

BACKGROUND

Electrocution insect traps are known, such as illustrated in U.S. Pat. No. 3,998,000. A housing is provided with fluorescent insect attractant lamps therein. The lamps are selected to provide proper wavelengths of light to attract the insects. An electrocution grid is provided within the housing to electrocute the attracted insects.

It is also known to provide glueboard insect traps which also have insect attractant lamps, but do not rely upon electrocution. Rather, they utilize sticky glueboards to which the attracted insects stick after passing through a guard grill at a front of a housing. The glueboards are retained behind the guard grill within the housing.

Installation, retention, and removal of such glueboards in previous glueboard insect traps have distinctive disadvantages.

SUMMARY

It is an object to provide a glueboard insect trap with an improved glueboard mounting, retention, and removal system which also results in improved performance of the glueboard insect trap.

In an insect trap a housing is provided having a swingable guard grill attached at a front of the housing. First and second insect attractant lamps are mounted in the housing. The guard grill has at least one window and a pivotable glueboard mounting, retention, and removal drawer assembly located at said window. The drawer assembly is pivotable at one end. The drawer assembly has a drawer panel and a V-shaped member attached to a back of the drawer panel. The V-shaped member has first and second transverse walls connecting at an apex, each wall having a respective window. A first glueboard is retained in arc-shaped fashion between said apex and the first corner and a second glueboard is retained in arc-shaped fashion between said apex and a second corner.

BRIEF DESCRIPTION OF THE DRAWINGS

FIG. 7 is a perspective fragmentary view of a hinge assembly for the lower drawer assembly shown in FIG. 1;

FIGS. 8A-8F illustrate mounting, retention, and removal of glueboards for the insect trap of FIGS. 2 and 4 when the drawer assembly is in the open position and/or the guard grill is in the open position.

DESCRIPTION OF PREFERRED EXEMPLARY EMBODIMENTS

Figure 1:
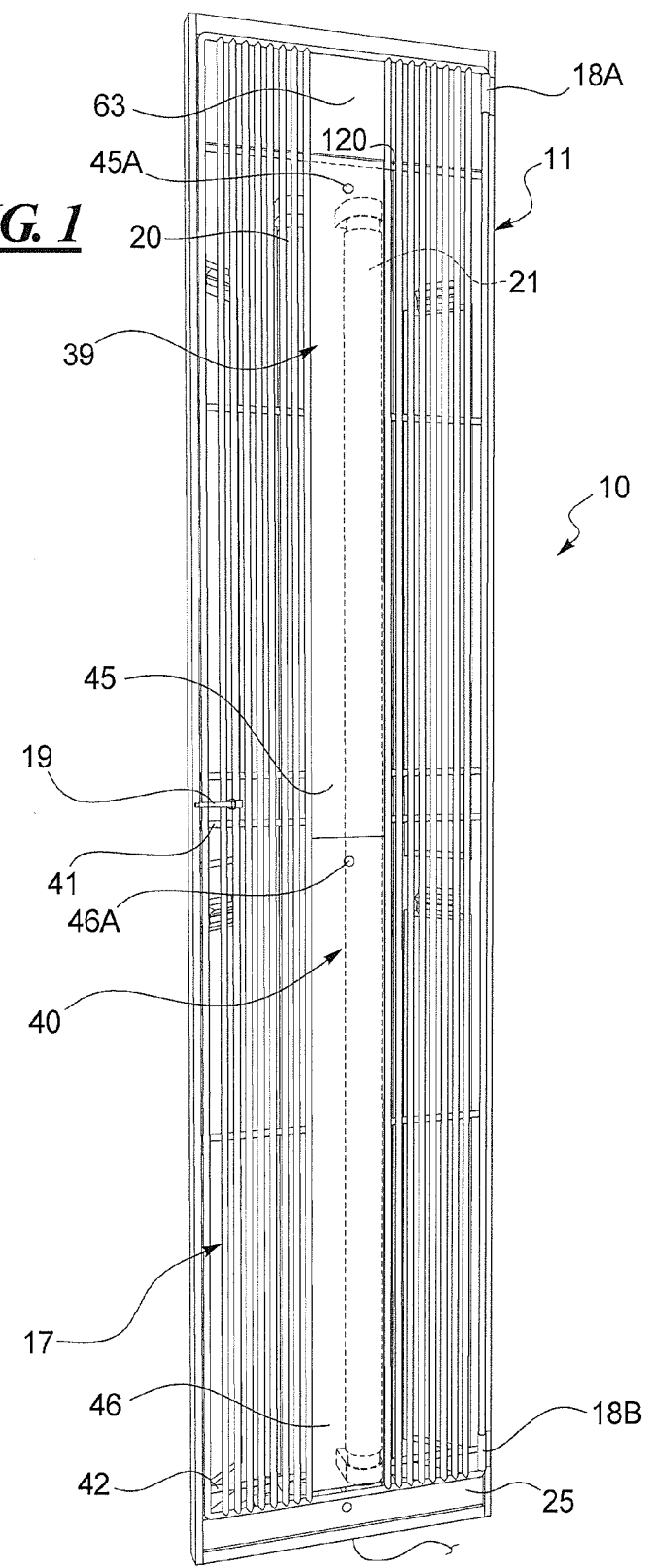
FIG. 1 is a perspective view of the insect trap of a preferred exemplary embodiment with improved glueboard mounting, retention, and removal drawer assemblies in a closed position.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and in which are included such alterations and further modifications in the illustrated embodiments and such further applications of the principles of the invention as illustrated as would normally occur to one skilled in the art to which the invention relates.

Figure 3:
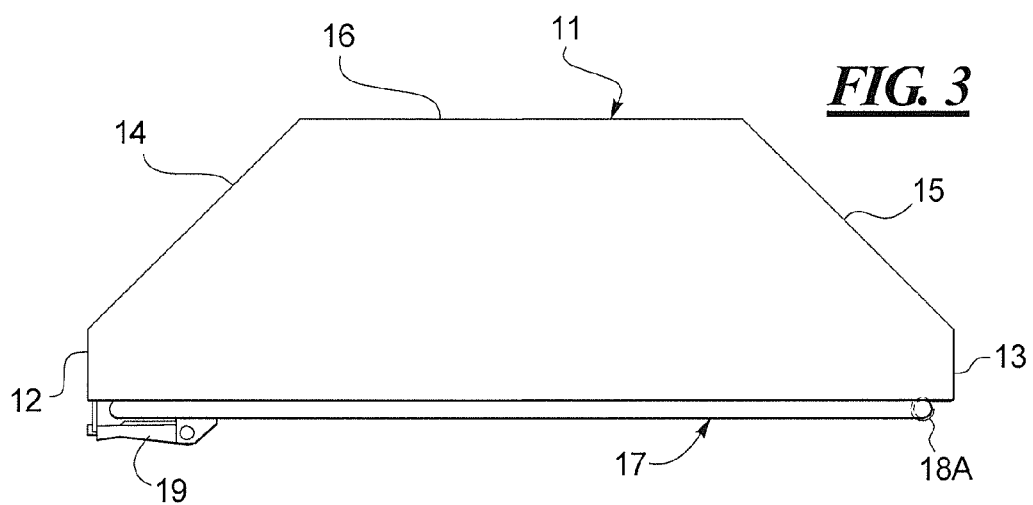
FIG. 3 is a top view of the insect trap of FIG. 1.

The insect trap with improved glueboard mounting, retention, and removal drawer assemblies 39 and 40 is generally illustrated at 10 in FIG. 1. A housing 11 is provided having a top view profile as shown in FIG. 3. The housing 11 has short side walls 12 and 13, transverse sidewalls 14 and 15 with an interior reflective surface to enhance illumination in and outside the housing, and a back wall 16. With such a housing shape, the trap can be corner or wall mounted or positioned. A front of the housing has a guard grill 17 attached by hinges 18A, 18B to a front edge of sidewall 13. A latch 19 at a left side of the grill 17 secures the grill in a closed position to left sidewall 12.

Figure 4:
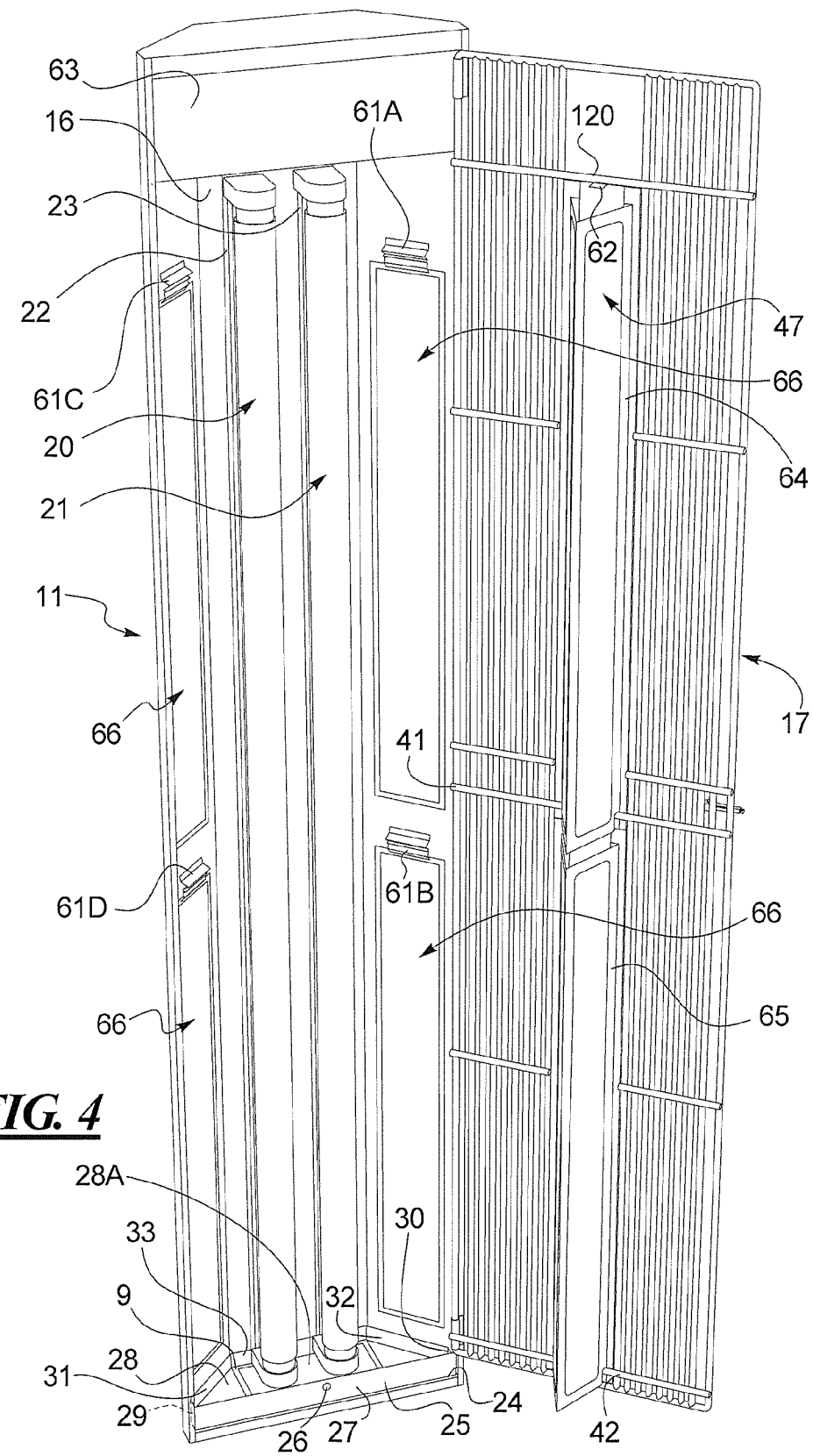
FIG. 4 is a perspective view of the FIG. 1 insect trap but with a guard grill thereof in an open position.

FIG. 4 shows the grill 17 in a swing open position after latch 19 has been unlatched. The housing 11 has mounted within an interior thereof first and second fluorescent insect attractant lamps 20 and 21 retained by respective fluorescent lamp mounts 22 and 23 at an inside surface of the back wall 16 of the housing. Further note that the drawer assemblies 39 and 40 are positioned within respective upper and lower windows 64 and 65 in the front guard grill 17 as illustrated in FIG. 4.

A removable tray 25 as shown in FIG. 4 rests on a floor 24 of the housing. This tray is slidable in and out by use of a knob 26 on a front wall 27 of the tray 25. The tray has a floor 28 and a lip structure surrounding a periphery of the floor defined by lip side walls 29 and 30, transverse lip side walls 31 and 32, and back lip wall 33. A glueboard 9 may be placed on the tray floor 28 with sticky glue layer 28A facing upwardly.

Figure 5:
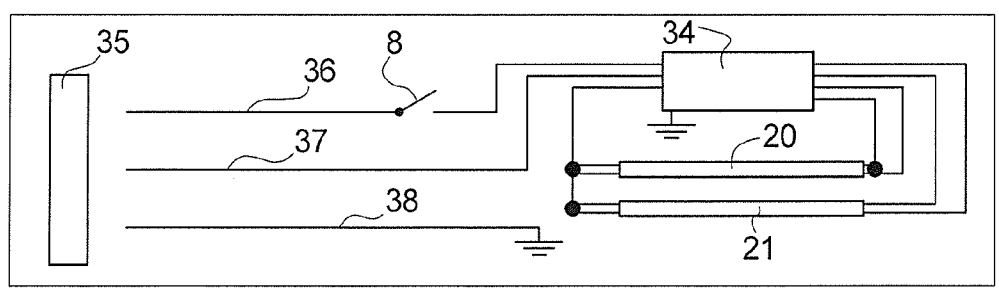
FIG. 5 is a schematic diagram of an insect attractant fluorescent lamp lighting system utilized within the housing of the insect trap of FIG. 1.

The lighting system for illumination of the first and second fluorescent lamps 20 and 21 is shown in FIG. 5. A ballast 34 is connected to the fluorescent lamps 20 and 21. The ballast is powered by an AC line source 35 connected to input lines 36 and 37. A ground line 38 may also be provided. An on/off switch 8 is provided in power line 36.

Figure 2:
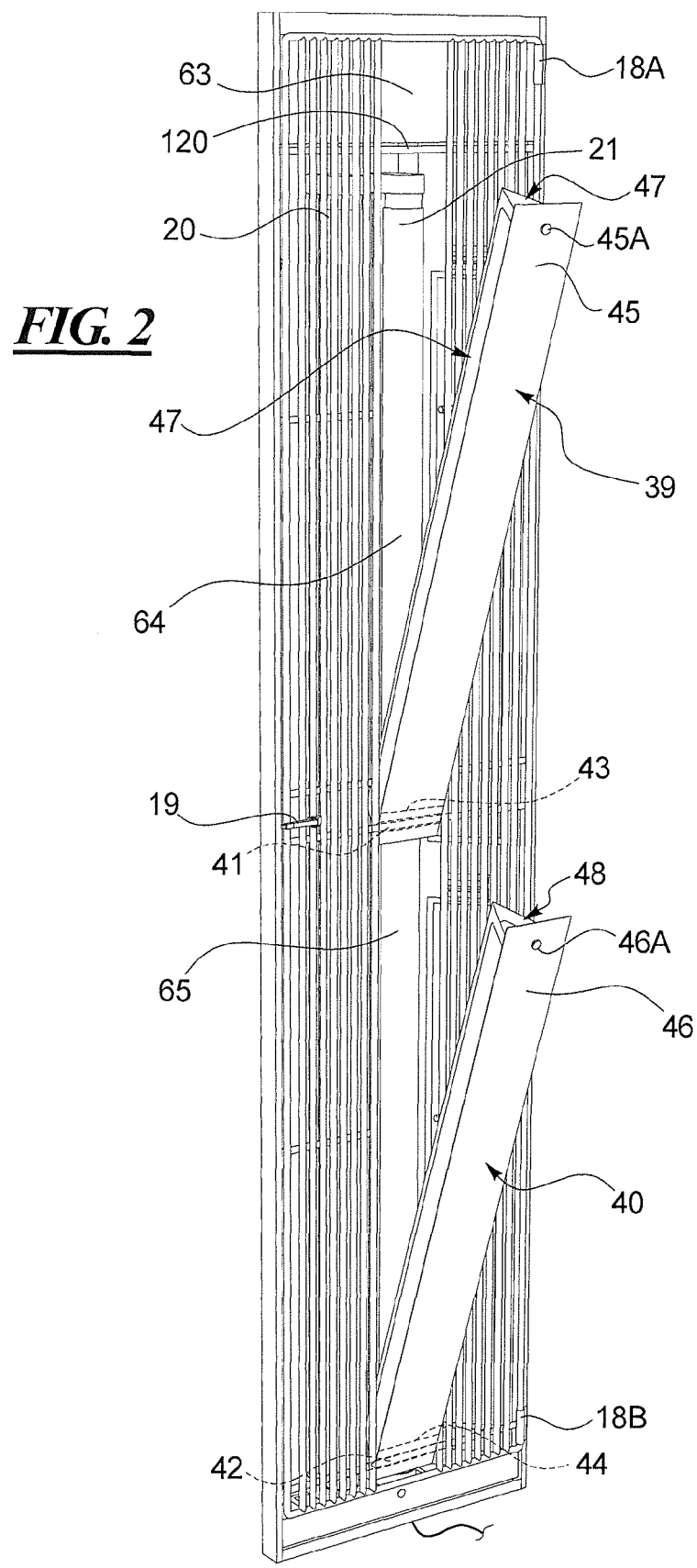
FIG. 2 is a perspective view of the FIG. 1 insect trap but with the drawer assemblies in an open position.

Details of the improved glueboard mounting, retention, and removal drawer assemblies will now be described. As shown in FIGS. 1 and 2, open and closable upper and lower pivoting drawer assemblies 39 and 40 are provided. These drawer assemblies are shown in a closed position in FIG. 1 and in an open position in FIG. 2. The drawer assemblies pivot about respective pivot rods 41 and 42 passing through respective pivot channels 43 and 44 attached at a bottom end of respective front pivot drawer panels 45 and 46. The pivot rods are part of the guard grill 17. Details for the lower pivot channel 44 are shown most clearly in FIG. 7 for the lower drawer assembly 40. The door panels 45 and 46 have respective knobs 45A and 46A for opening and closing the drawer assemblies by pivoting about the respective hinge pivot rods 41 and 42.

Figure 6:
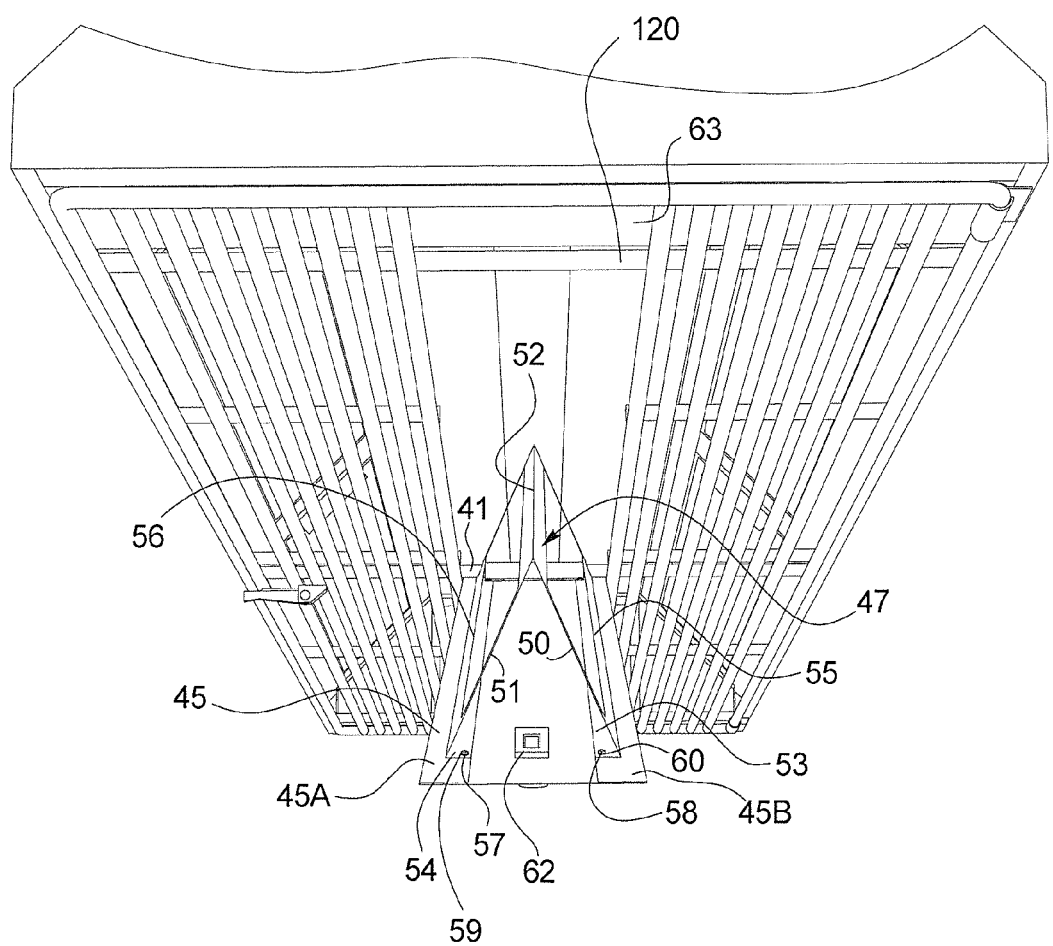
FIG. 6 is a top perspective view of an upper one of the glueboard drawer assemblies in an open position.

At a back surface of the drawer panel 45 a V-shaped member 47 is attached as shown most clearly in FIG. 6 with glueboards removed. A similar V-shaped member 48 is attached at the back of lower pivoting drawer panel 46 (see FIG. 2).

As shown in FIG. 6, each of the V-shaped members comprises transverse walls 50 and 51 connected at an apex 52. Mounting flanges 54 and 55 are integrally attached at an edge of the respective transverse walls opposite the apex 52. Respective cutout windows 55 and 56 are provided in the transverse walls 50 and 51. Preferably the apex 52, with the drawer assembly in the closed position, is positioned near the housing back wall and between the insect attractant lamps.

The drawer panel 45 has folded over portions 45A and 45B where the mounting flanges 54 and 55 are attached. These flanges 54 and 55 are mounted by screws 57 and 58 with corresponding lock nets 59 and 60. Only two of these screws are shown for clarity but others are provided upwardly along the flange.

At a top of the panel 45 a drawer retention clip 62 is provided which engages with a rod 120 just below a top front cover plate 63 which lies behind the swingable front guard grill 17. This cover plate and a floor section behind the cover plate encloses a front of a ballast compartment housing the ballast. A similar clip on the lower door panel engages a lower edge of the top drawer panel and also the pivot rod 41.

Mounting clips 61A-61D for additional glueboards 66 are provided on the inside surface of housing transverse reflective side walls 14 and 15 as shown in FIG. 4.

Figure 9:
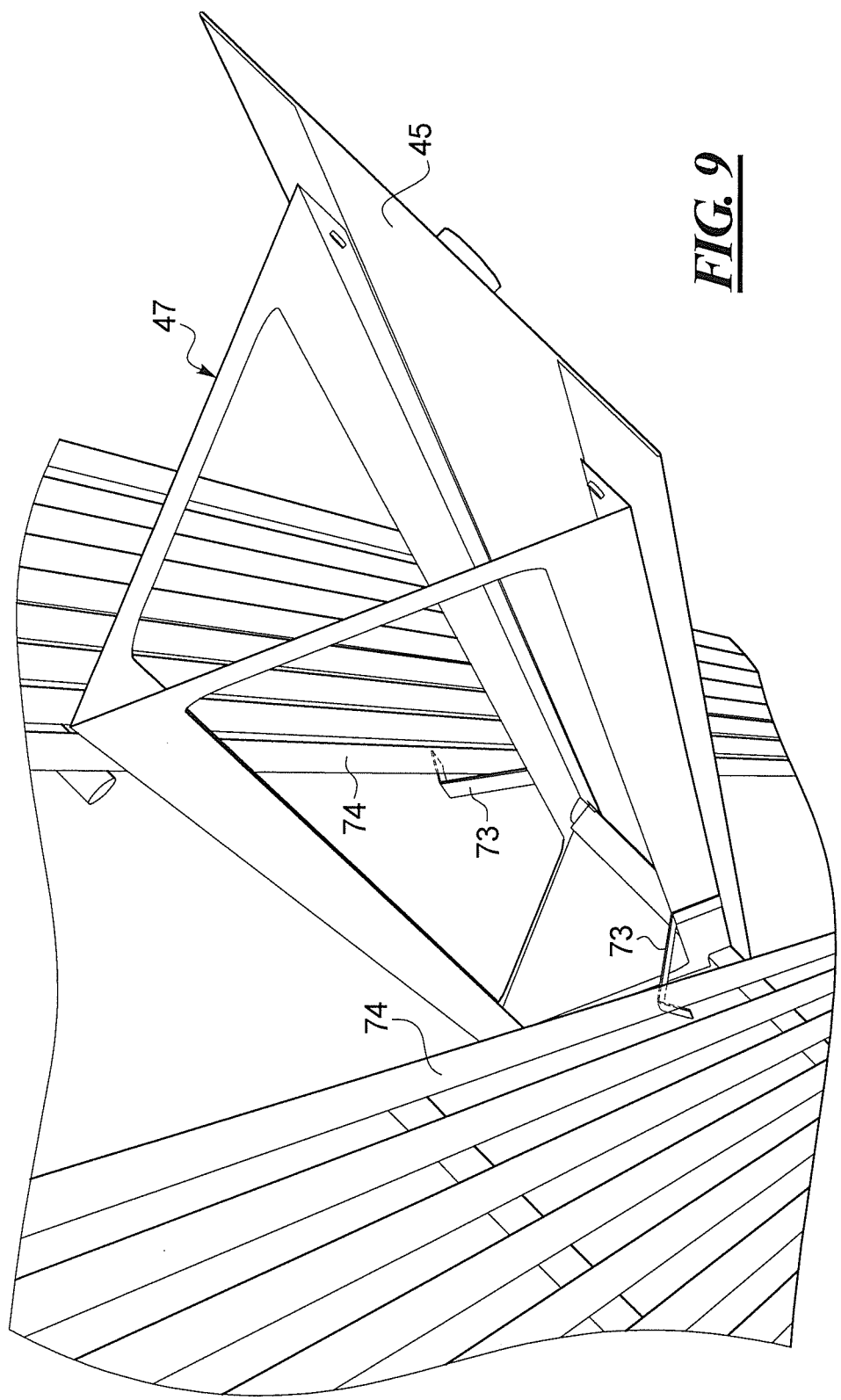
FIG. 9 is a perspective fragmentary view of a further embodiment of the improved glueboard mounting, retention, and removal assembly.

As shown in FIG. 9, the V-shaped member 47 of the panel 45 may be provided with angled stops 73 that abut against the innermost grill rods 74 of the guard grill, to limit the extent to which the panel 45 can be pivoted in the open position. Preferably, the panel 45 is pivotable on the rods 41 and 42 only to a sufficient extent to permit access for exchanging the glueboard 66.

Mounting, retention, and removal of glueboards will now be described with respect to FIGS. 8A-8F.

As shown in FIGS. 8A and 8B, a rectangular glueboard 66 has a sticky glue layer 67 on one surface of a cardboard substrate 102. A release paper 68 shown most clearly in FIG. 8B is provided sticking to and overlying the glue layer.

Figure 8C:
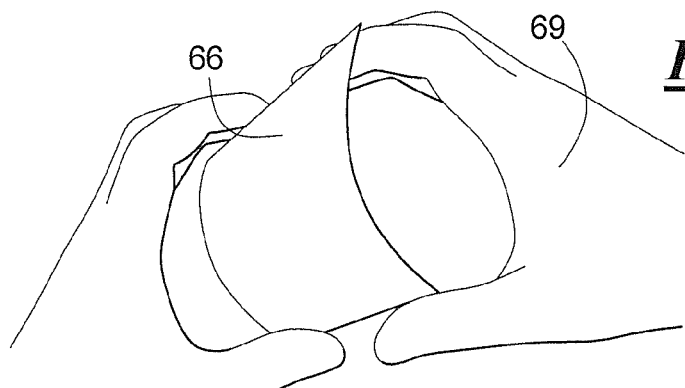
Figure 8D:
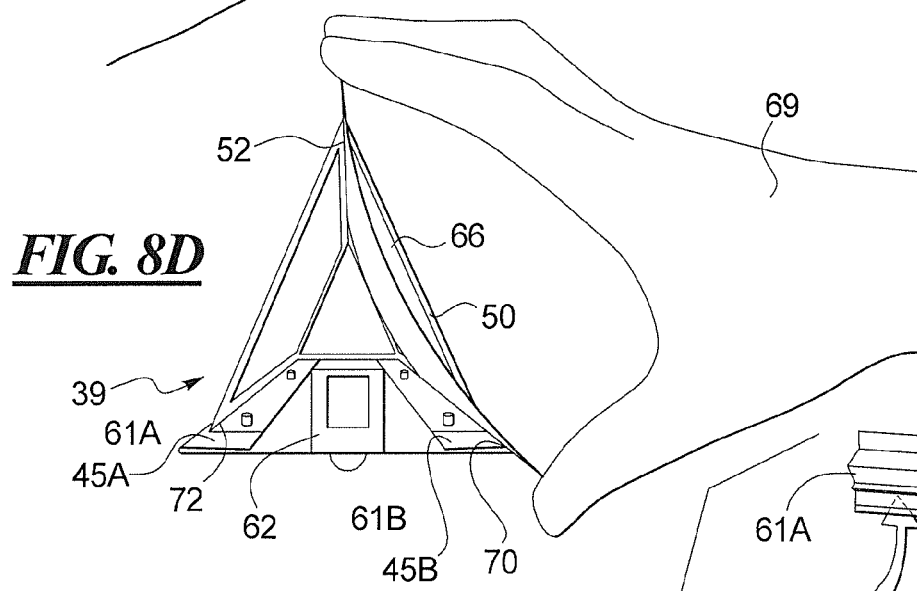
Figure 8E:
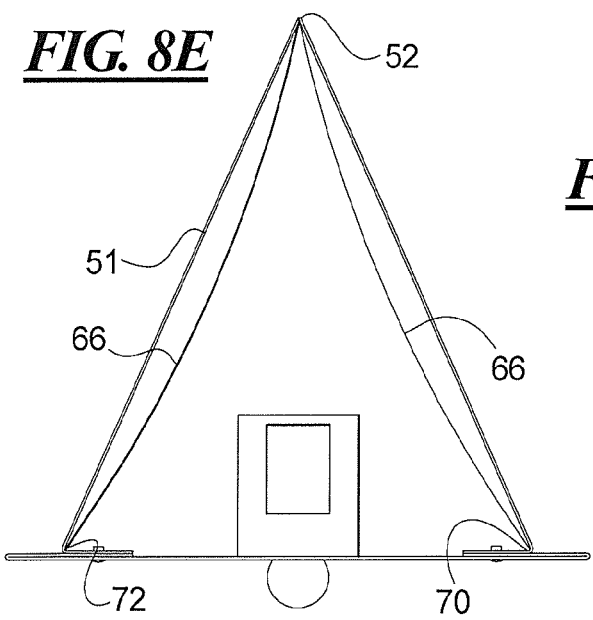

As illustrated in FIG. 8B a user 69 whose hand is shown removes the release paper 68 from the glueboard. Thereafter, as shown in FIG. 8C, the user 69 curves the glueboard 66 into an arc shape and then inserts the glueboard 66 while held in the arc shape into the V-shaped member 47 of the insertion, retention, and removal drawer assembly 39 at the inside of the transverse side wall 50 and slides it down along the V-shaped member between the apex 52 and corner 70. FIG. 8E illustrates a second glueboard 70 installed on the opposite side adjacent transverse wall 51 between the apex 52 and an opposite corner 72.

Figure 8F:
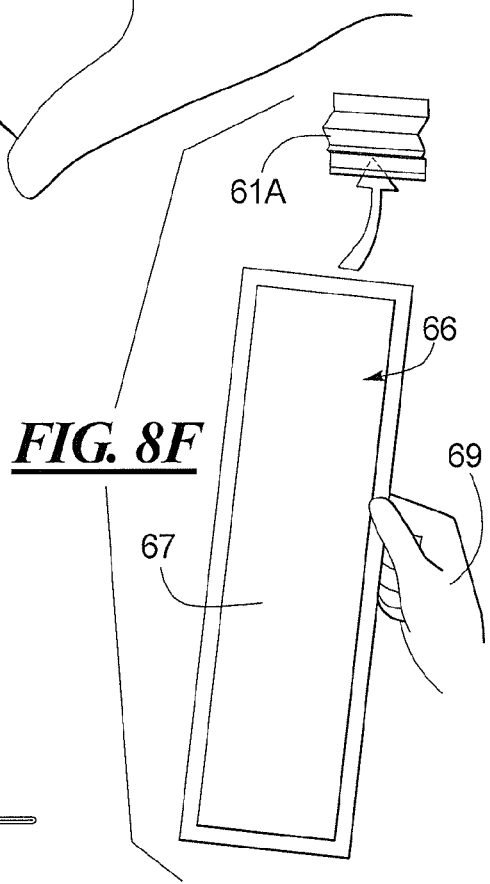

Up to four additional glueboards 66 may also be inserted in the housing in addition to the four glueboards 66 which may be retained by the V-shaped members of the respective door assemblies 39 and 40. These are retained at the clips 61A-61D shown in FIG. 4. In FIG. 8F one of these glueboards 66 is shown being slipped under the respective clip 61A.

Although two pivoting drawer assemblies are shown, it is within the scope of the exemplary embodiments that only one drawer assembly be provided. Also the insect trap may be designed for a longitudinal horizontal positioning with the drawers extending horizontally rather than vertically. In such a case the drawers may be hinged along the longitudinal bottom edge, for example.

Thus up to eight glueboards may be used in the trap: namely two in each of the drawer assemblies and four more on the transverse walls.

The housing transverse walls are preferably reflective at their inside surfaces.

Removal of the glueboards is simplified since the user simply grabs the top edge of the glueboards when the respective drawer assembly is pivoted outwardly.

In view of the convenience of installation and removal, glueboards can be replaced frequently such as weekly, bi-weekly, or monthly. Thus dermestid beetles or other cultures which may result from leaving dead insects in the trap for an excessive length of time is avoided.

When it is decided to clean an interior of the trap, one disconnects power, swings open the guard grill, and washes the lamps and inner body with a warm soapy solution and rinse as needed. The lamps may be cleaned and replaced such as yearly when insect catching no longer meets requirements.

Replacement of the glueboards is a simple process. First one uses the knob to tilt out the panel assembly where easy access to the V-shaped member is assured. The old glueboards are removed and new glueboards are prepared for insertion by removing the release paper with one continuous pull. The glueboard is slipped into the retention assembly from above with one on each side of the V-shaped member with sticky-side out. Four additional glueboards may be wedged into the clips provided inside the trap, two on each side.

The insect trap of the preferred exemplary embodiment has improved performance since the apex of the V-shaped member lies between the lamps and thus the glue layer on each glueboard in the V-shaped member is close to the respective lamp and therefore insects are more likely to be captured by the respective glueboard.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

The invention claimed is:

1. An insect trap, comprising:
   a housing having a guard grill attached at a front of the housing in swingable fashion between an open and closed position;
   first and second insect attractant lamps mounted in spaced apart relationship to each other in the housing;
   said guard grill having at least one window and a pivotable glueboard mounting, retention, and removal drawer assembly located at said at least one window, said drawer assembly being attached and pivotable about an attachment element of said grill at a bottom end of the drawer assembly;
   said drawer assembly having a drawer panel and a V-shaped member attached to a back of the drawer panel;
   said V-shaped member having respective first and second transverse walls connecting at an apex, each wall having a respective window;
   a first glueboard retained in an arc-shaped bent fashion between said apex and a first corner and a second glueboard retained in an arc-shaped bent fashion between said apex and a second corner opposite said first corner, each of the glueboards having a glue layer facing outwardly for exposure to insects to permit capture thereof on said sticky glue layer through the respective windows wherein said apex is substantially positioned between said first and second lamps when said drawer assembly is in a closed position.

2. The trap of claim 1 wherein said guard grill accommodates two of said drawer assemblies in pivotable fashion, one above the other.

3. The trap of claim 1 wherein said drawer assembly has a projection thereon for a user to pull the drawer into an open position.

4. The trap of claim 1 wherein said guard grill has a plurality of vertical rods and at least one horizontal rod as said attachment element about which said drawer assembly pivots.

5. The trap of claim 4 wherein a channel member is attached to a bottom end of said drawer assembly through which said horizontal rod passes.

6. The trap of claim 1 wherein said housing has opposing side walls, opposing transverse walls connected to said side walls, and a back wall, and wherein on said transverse walls at an interior surface at least one respective clip being provided for retaining an additional glueboard.

7. The trap of claim 1 wherein the drawer assembly has a retention clip for holding the drawer in a closed position.

8. The trap of claim 1 wherein a stop surface is provided at a bottom of the V-shaped member to stop a bottom edge of the glueboard when being inserted by a user.

9. An insect trap, comprising:
- a housing having a guard grill attached at a front of the housing in swingable fashion between an open and closed position;
- first and second insect attractant lamps mounted in the housing;
- said guard grill having at least one window and a pivotable glueboard mounting, retention, and removal drawer assembly located at said at least one window, said drawer assembly being attached and pivotable about an attachment element of said grill;
- said drawer assembly having a member attached at a back of the drawer assembly;
- said member having respective first and second transverse walls connecting at an apex, each wall having a respective window;
- a first glueboard retained between said apex and a first corner and a second glueboard retained between said apex and a second corner opposite said first corner, each of the glueboards having a glue layer facing outwardly for exposure to insects to permit capture thereof on said sticky glue layer through the respective windows wherein said apex is substantially positioned between said first and second lamps when said drawer assembly is in a closed position.

10. The insect trap of claim 9 wherein a stop member is provided preventing the drawer assembly from moving beyond a defined position in said open position.

* * * * *